US008458774B2

(12) United States Patent
Ganesan

(10) Patent No.: US 8,458,774 B2
(45) Date of Patent: Jun. 4, 2013

(54) METHOD FOR SECURE SITE AND USER AUTHENTICATION

(75) Inventor: Ravi Ganesan, Half Moon Bay, CA (US)

(73) Assignee: Authentify Inc., Chicago, IL (US)

( * ) Notice: Subject to any disclaimer, the term of this patent is extended or adjusted under 35 U.S.C. 154(b) by 368 days.

(21) Appl. No.: 12/938,161

(22) Filed: Nov. 2, 2010

(65) Prior Publication Data

US 2011/0107407 A1 May 5, 2011

Related U.S. Application Data

(60) Provisional application No. 61/257,207, filed on Nov. 2, 2009.

(51) Int. Cl.
*H04L 9/00* (2006.01)

(52) U.S. Cl.
USPC ............ 726/4; 726/3; 726/5; 726/6; 715/700; 709/203

(58) Field of Classification Search
USPC .............................................................. 726/4
See application file for complete search history.

(56) References Cited

U.S. PATENT DOCUMENTS

| 7,552,467 | B2 * | 6/2009 | Lindsay ............................ 726/5 |
| 7,908,645 | B2 * | 3/2011 | Varghese et al. .................... 726/4 |
| 7,949,716 | B2 * | 5/2011 | Alperovitch et al. ......... 709/206 |
| 8,136,148 | B1 | 3/2012 | Chayanam et al. |

(Continued)

FOREIGN PATENT DOCUMENTS

| JP | 11-338933 | 12/1999 |
| JP | 2002-259344 | 9/2002 |
| JP | 2005-209083 | 8/2005 |
| WO | WO 2007107868 | 9/2007 |

OTHER PUBLICATIONS

International Search Report and Written Opinion, PCT/US2012/032840, Jun. 20, 2012.

(Continued)

*Primary Examiner* — Ashok Patel
*Assistant Examiner* — Andrew Goldberg
(74) *Attorney, Agent, or Firm* — Antonelli, Terry, Stout & Kraus, LLP.

(57) ABSTRACT

The present invention provides a new method of site and user authentication. This is achieved by creating a pop-up window on the user's PC that is in communication with a security server, and where this communication channel is separate from the communication between the user's browser and whichever web site they are at. A legitimate web site embeds code in the web page which communicates to the security server from the user's desktop. The security server checks the legitimacy of the'web site and then signals both the web page on the user's browser, as well as the pop-up window to which it has a separate channel. The security server also sends a random image to both the pop-up window and the browser. If user authentication is requested by the web site the user is first authenticated by the security server for instance by out of band authentication. Then the security server computes a one time password based on a secret it shares with the web site and sends it to the pop up window. The user copies this one time password into their browser which sends it to the web site, which can re-compute the one time password to authenticate the user.

13 Claims, 2 Drawing Sheets

U.S. PATENT DOCUMENTS

| | | |
|---|---|---|
| 2002/0095507 A1 | 7/2002 | Jerdonek |
| 2003/0028451 A1 | 2/2003 | Ananian |
| 2004/0030934 A1 | 2/2004 | Mizoguchi et al. |
| 2004/0210536 A1 | 10/2004 | Gudelj et al. |
| 2004/0225878 A1 | 11/2004 | Costa-Requena et al. |
| 2004/0242238 A1 | 12/2004 | Wang et al. |
| 2005/0135242 A1 | 6/2005 | Larsen et al. |
| 2005/0172229 A1* | 8/2005 | Reno et al. ............ 715/700 |
| 2005/0254653 A1 | 11/2005 | Potashnik et al. |
| 2006/0168259 A1 | 7/2006 | Spilotro |
| 2006/0168663 A1 | 7/2006 | Viljoen et al. |
| 2006/0235795 A1 | 10/2006 | Johnson et al. |
| 2007/0011724 A1 | 1/2007 | Gonzalez et al. |
| 2007/0067828 A1 | 3/2007 | Bychkov |
| 2007/0074276 A1 | 3/2007 | Harrison et al. |
| 2007/0079135 A1 | 4/2007 | Saito |
| 2007/0136417 A1* | 6/2007 | Kreiner et al. ............ 709/203 |
| 2007/0157304 A1 | 7/2007 | Logan et al. |
| 2007/0174904 A1 | 7/2007 | Park |
| 2007/0186095 A1 | 8/2007 | Ganesan et al. |
| 2007/0198437 A1 | 8/2007 | Eisner et al. |
| 2007/0279227 A1 | 12/2007 | Juels |
| 2007/0283273 A1 | 12/2007 | Woods |
| 2008/0028447 A1 | 1/2008 | O'Malley et al. |
| 2008/0034216 A1 | 2/2008 | Law |
| 2008/0052180 A1 | 2/2008 | Lawhorn |
| 2008/0109657 A1 | 5/2008 | Bajaj et al. |
| 2008/0120707 A1 | 5/2008 | Ramia |
| 2008/0172730 A1 | 7/2008 | Sandhu et al. |
| 2008/0254765 A1 | 10/2008 | Eliaz |
| 2008/0320594 A1* | 12/2008 | Jiang ............ 726/24 |
| 2009/0037983 A1 | 2/2009 | Chiruvolu et al. |
| 2009/0093300 A1 | 4/2009 | Lutnick et al. |
| 2009/0119754 A1 | 5/2009 | Schubert |
| 2009/0119776 A1 | 5/2009 | Palnitkar et al. |
| 2009/0132813 A1 | 5/2009 | Schibuk |
| 2009/0235339 A1 | 9/2009 | Mennes et al. |
| 2009/0249076 A1 | 10/2009 | Reed et al. |
| 2009/0249077 A1 | 10/2009 | Gargaro et al. |
| 2009/0254572 A1 | 10/2009 | Redlich et al. |
| 2009/0259588 A1 | 10/2009 | Lindsay |
| 2009/0259848 A1 | 10/2009 | Williams et al. |
| 2009/0265768 A1 | 10/2009 | Labaton |
| 2009/0288159 A1 | 11/2009 | Husemann et al. |
| 2009/0328168 A1 | 12/2009 | Lee |
| 2010/0017860 A1 | 1/2010 | Ishida |
| 2010/0024022 A1 | 1/2010 | Wells et al. |
| 2010/0041391 A1 | 2/2010 | Spivey et al. |
| 2010/0235897 A1 | 9/2010 | Mason et al. |
| 2010/0262834 A1 | 10/2010 | Freeman et al. |
| 2010/0268831 A1 | 10/2010 | Scott et al. |
| 2011/0153496 A1 | 6/2011 | Royyuru |
| 2011/0161989 A1 | 6/2011 | Russo et al. |
| 2011/0208801 A1 | 8/2011 | Thorkelsson et al. |
| 2012/0005483 A1 | 1/2012 | Patvarczki et al. |
| 2012/0124651 A1 | 5/2012 | Ganesan et al. |

OTHER PUBLICATIONS

PCT International Search Report and Written Opinion issued in International Application No. PCT/US 11/22482 on Jan. 26, 2011.
International Search Report/Written Opinion, PCT/US2011/023525, mailed Apr. 5, 2011.
International Search Report/Written Opinion, PCT/US2011/022486, mailed Apr. 20, 2011.
International Search Report/Written Opinion, PCT/US2011/023528, mailed Apr. 27, 2011.
International Search Report/Written Opinion, PCT/US2011/032295, mailed Jun. 13, 2011.
International Search Report/Written Opinion, PCT/US2011/032271, mailed Jul. 11, 2011.
Gralla, P. How the Internet Works, 2006, Que, pp. 346-347.
WOT *online). Against Intuition Inc., 2006 retrieved on Aug. 24, 2012). Retrieved from the *Internet: URL:web.archive.org/web/20061127233933/http://www.mywot.com/en/wot/help/wot_symbols_explained/, pp. 1-3.

\* cited by examiner

METHOD FOR SECURE SITE AND USER AUTHENTICATION

RELATED APPLICATIONS

This application claims priority based on Provisional U.S. Application Ser. No. 61/257,207, filed Nov. 2, 2009, and entitled "Project Seal", the contents of which are incorporated herein in their entirety by reference.

TECHNICAL FIELD

This invention relates to security and privacy. More particularly it relates to site and user authentication.

BACKGROUND OF THE INVENTION

Fake web sites are frequently used to trick users into revealing confidential information. Site "seals" with a logo which the user associates with security help give users a sense of comfort when visiting a legitimate web site. This is analogous to a Better Business Bureau sticker in a physical storefront. However, on the web it is trivial for a fake site to copy such a seal. Trying to detect sites with such counterfeit seals and to then take down these sites is a slow process. Another alternative, having seals which require a user to click on them to verify authenticity expects users to be far more proactive and careful then they have proven to be. A somewhat more secure alternative is to install a toolbar that examines each page the user downloads and checks whether the source is a known malicious site. The disadvantage of this approach is that the user has to download and install a toolbar. Another approach that has proven not to work is the use of the SSL, infrastructure wherein users are expected to navigate a maze of locks, green bars and frequent cryptic error messages, in order to ascertain the legitimacy of a site. When combined with the rise of man in the middle (MITM) and man in the browser (MITB) attacks, it is safe to say that current site authentication techniques on the web simply do not work.

The converse problem of user authentication to a web site is even more challenging. Most techniques for authentication like passwords and one time passwords are considered vulnerable to MITM and MITB attacks. Exacerbating the situation is the notion of single sign on or federation; namely the notion that one site will vouch for the authenticity of the user to several other sites. A single key to open several doors is certainly convenient, but if that one key is weak, then the risk has just been amplified.

The innovation described herein seeks to use a single approach to greatly increase the security of both site and user authentication.

OBJECTIVES OF THE INVENTION

This invention has the following objectives:
Develop a site authentication "seal" technique that is not easily defeated by counterfeit web sites, and which does not require the user to download and install a toolbar or to click on the seal to check its genuineness.
Develop a new method of user authentication based on one time passwords which crucially does not require the provisioning of a per user secret, but rather only requires a per relying web site shared secret.
Use the new methods of site and user authentication to achieve more secure and convenient single sign on.
Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

Our first innovation is to create a new method of site authentication that is not easily counterfeited. We achieve this by creating a pop-up window on the user's PC that is in communication with a security server, and where this communication channel is separate from the communication between the user's browser and whichever web site they are at. A legitimate web site embeds code in the web page which communicates to the security server from the user's desktop. The security server ensures the web site is not known to be malicious, and then signals both the web page on the user's browser, as well as the pop-up window to which it has a separate channel, that the web site is genuine. The 'signal' to the user can take the form of a visual cue conveying the concepts of "good site" or "bad site" or "do not know".

Our second innovation is to strengthen the security of the signaling mechanism described above by having the security server send a random image with the signal to both the pop-up window and the user's browser. The user who sees the image in both places gets further reassurance that the web site is safe.

Our third innovation ensures that counterfeiting the pop-up window is made very difficult by having the user select a personalization image which appears in the pop-up window. An attacker who tries to pop-up a fake window is foiled as they cannot know the personalization image.

Our fourth innovation is to have the user authenticate to the security server and use the signaling mechanism described above to communicate assertions about the user's identity to the web site, thus enabling single sign on for the user.

Our fifth innovation is to have the security server provide the user with a fresh one time password for authentication into the web site, where the one time password is constructed using a secret shared between the web site and the security server, obviating the necessity of maintaining a per user shared secret which is a requirement for previous one time password mechanisms.

PREFERRED EMBODIMENT(S) OF THE INVENTION

Figure 1:
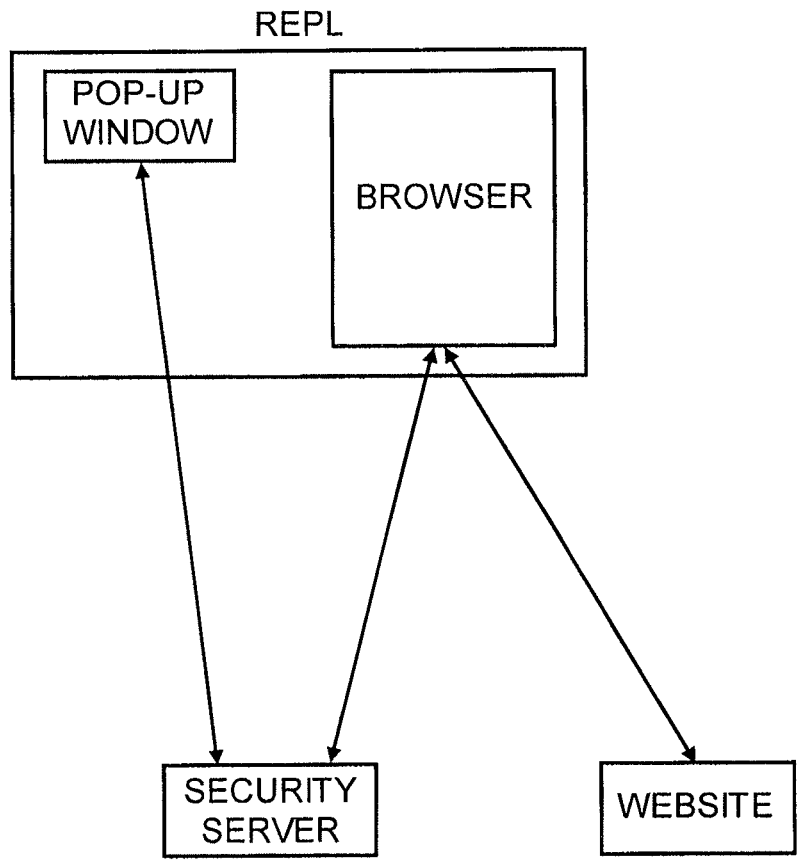
FIG. 1 describes the main components of the system.

We will first describe the preferred embodiment for site authentication and then describe how the system can be augmented to also perform user authentication. As shown in FIG. 1 the system consists of the following components:
A security server.
A pop-up window on the user's desktop.
A browser on the user's desktop.
The web site the user is browsing.

There are three distinct phases of operation: (i) the set-up and personalization of the pop-up window which is a one time process, (ii) the start-up of the pop-up window which happens at periodic intervals (akin to logging into a computer at each use), and (iii) The wake-up process when the user browses to a web site that can authenticate itself to the user using the security server.

For set-up the user visits a web site hosted at the security server and selects a personalization image. This image is stored locally on the user's PC using cookies, FLASH storage or similar local storage options. This is in general a one time event per user per PC, and only need be repeated if the user wants to change the personalization image, or the local storage is deleted for some reason.

Start-up occurs at periodic events. For instance this could happen once a day before the user begins browsing the web. The user can initiate the process manually, via a bookmark or bookmarklet, or by using the user's default web page mechanism. Alternately, there could be wake-up code which is triggered by the user visiting a web site that uses the system. Once the pop-up has been started it will be on the user's desktop occupying a relatively small amount of space. Typically the user will position the pop-up at a convenient location on their screen. The act of starting up the pop-up also results in the security server planting a local session object (for instance in a session cookie) on the user's PC.

A web site that wishes to participate in the system will embed on the page code to access the system. Typically this will be in the form of Javascript code within an iFrame. The code will reach out to the security server, an act that transfers to the security server, the previously planted session object. The security server checks the REFERRER or ORIGIN tag of the request from the iFrame against a known whitelist or blacklist of permitted/prohibited sites. It then responds to the iFrame and simultaneously signals the pop-up it is in communication with. The signal consists of two parts, first an indication of whether the web site is "good", "bad", or that the security server "does not know". The second part of the signal is a random image that is sent (if the site is legitimate) to the pop-up and to the iFrame. For a legitimate web site the user's pop-up will have a visual cue (e.g. a green light) that the web site is "good" and will show a random image. The iFrame will also show a similar visual cue and critically will also show the same random image. If the web site was on a black list the pop-up will show a visual cue (e.g. a red light) that indicates the site is "bad".

Attackers trying to defeat the system by creating a fake pop-up are thwarted because they will not know the personalization image. And, an attacker who tries to display the visual cue in the iFrame will not succeed as they do not know the random image that is sent to the pop-up. Finally, a counterfeit web site will not be able to manipulate the REFERRER or ORIGIN tag as it is inspected by the browser.

The communication between the pop-up and the security server can be implemented in a variety of ways. One approach would be to have the pop-up repeatedly make XHR requests with long time outs. Consequently whenever the security server has a need to send a message to the pop-up and simply opens to the currently open XHR request.

The system described above can be extended to communicate assertions about the user from the security server to the web server. We assume that the user, preferably during start-up, uses some method of authenticating to the security server. For instance the user could prove possession of credentials issued previously or use an out of band authentication technique to prove possession of a phone number. Once this has happened the security server is in a position to respond to requests for identity assertions from the web site. One way to achieve this would simply be for the web site to send the security server an assertion request, for instance via the request in the iFrame, and the security server can simply respond with the assertion. This request response could use the format of standards such as OpenID or SAML. This marries site authentication to user authentication (something that federation protocols like OpenID and SAML do not address) which provides significant security benefits.

Figure 2:
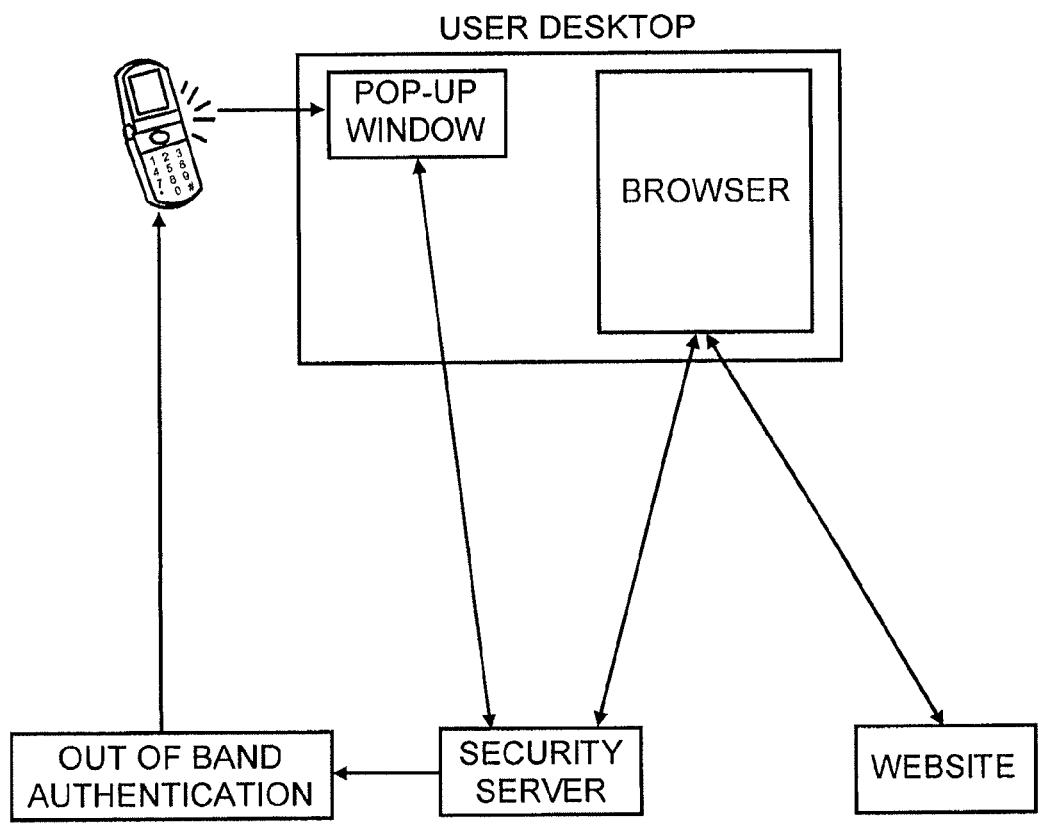
FIG. 2 shows the system augmented with user authentication, in this case achieved using out of band authentication.

A final innovation allows us to significantly strengthen the binding between the user, the security server acting as an Identity Provider and the web site which is the Relying Party. First, we assume that the security server and the web site have a priori agreed on a shared secret (the system is easily extended to use public key cryptography). Second, as shown in FIG. 2, we assume that the user has used some method, for instance out of band authentication, to authenticate to the security server. When the user is at a web site that requests authentication, and the web site communicates this request to the security server, the security server calculates a one time password as a function of the secret shared with the web site and some other information, and displays it to the user in the pop-up window. The user enters (perhaps by cutting and pasting) this one time password into the web site, which confirms authenticity by re-computing the one time password. This system has all the security properties of one time passwords, yet has the tremendous advantage that it does not require a shared secret with each user, and it is only the security server and the web sites that need shared secrets for the purpose of generating one time passwords. The actual one time password can be constructed based on a time stamp or a counter based OTP algorithm (in the way we use these algorithms the time or counter value needs to be communicated by the security server to the web site; or potentially computed deterministically using some agreed upon formula).

What is claimed is:

1. A method of authenticating a site on a network, comprising:

receiving, by a security server from a web page that is (i) associated with a network site and (ii) displayed by a user's network device, an identifier of the user's network device and an identifier, including a referral or origin tag, of the network site;

determining, by the security server, the legitimacy of the network site based on the received network site identifier being on a particular black list or white list;

transmitting, by the security server in response to the receipt of the identifiers, an indication of legitimacy of the network site, or that the security server does not know if the network site is legitimate or not, that will cause display of a corresponding legitimacy indicator on both the web page and a pop-up window displayed by the user's network device such that the user can compare the image in the web page with that in the pop-up to assure authenticity of the network site, wherein (i) the pop-up window is opened by the security server and operates independently of the web page, (ii) if the transmitted indication indicates that the network site is legitimate, the corresponding legitimacy indicator includes a first type visual cue in a first state and a random image chosen by the security server from a plurality of random images for display on both the web page and the pop-up window, wherein said image may be compared to ensure the authenticity of the pop-up and (iii) if the transmitted indication indicates that the network site is illegitimate, the corresponding legitimacy indicator includes the first type visual cue in a second state.

2. The method of claim 1, further comprising:
   storing, by the security server on the user's network device, a local session object;
   wherein the received user's network device identifier includes the stored local session object.

3. The method of claim 1, wherein the received network site identifier includes a network address of the network site included in the displayed web page.

4. The method of claim 1, wherein:
   the first type visual cue is a light;
   the first state is green; and
   the second state is red.

5. An article of manufacture for authenticating a site on a network, comprising:
   a non-transitory storage medium; and logic stored on the storage medium, wherein the stored logic is configured to be readable by a processor and thereby cause the processor to operate so as to:
   receive, from a web page that is (i) associated with a network site and (ii) displayed by a user's network device, an identifier of the user's network device and an identifier, including a referral or origin tag, of the network site;
   determine the legitimacy of the network site based on the received network site identifier being on a particular black list or white list;
   open a pop-up window for display on the user's network device;
   transmit, in response to the receipt of the identifiers, an indication of legitimacy of the network site, or that it is indeterminable whether the network site is legitimate or not, that will cause display of a corresponding legitimacy indicator on both the web page and the pop-up window displayed by the user's network device, such that the user can compare the image in the web page with that in the pop-up to assure authenticity of the network site, wherein (i) the pop-up window operates independently of the web page, (ii) if the transmitted indication indicates that the network site is legitimate, the corresponding legitimacy indicator includes a first type visual cue in a first state and a random image for display on both the web page and the pop-up window, wherein said image may be compared to ensure the authenticity of the pop-up, and (iii) if the transmitted indication indicates that the network site is illegitimate, the corresponding legitimacy indicator includes the first type visual cue in a second state.

6. The article of manufacture of claim 5, wherein:
   the stored logic is further configured to cause the processor to operate so as to store a local session object on the user's network device; and
   the received user's network device identifier includes the stored local session object.

7. The article of manufacture of claim 5, wherein the received network site identifier includes a network address of the network site included in the displayed web page.

8. A system for authenticating a site on a network, comprising:
   a device that comprises a processor and memory that stores instructions;
   and
   a communications port configured to receive, from a web page that is (i) associated with a network site and (ii) displayed by a user's network device, an identifier of the user's network device and an identifier, including a referral or origin tag, of the network site; and
   the processor configured with logic to determine the legitimacy of the network site based on the received network site identifier being on a particular black list or white list, open a pop-up window for display on the user's network device, and to direct transmission of an indication of legitimacy of the network site, or that it is indeterminable whether the network site is legitimate or not, that will cause display of a corresponding legitimacy indicator on both the web page and the pop-up window displayed by the user's network device such that the user can compare the image in the web page with that in the pop-up to assure authenticity of the network site;
   wherein (i) the pop-up window operates independently of the web page, (ii) if the network site is determined to be legitimate, the corresponding legitimacy indicator includes a first type visual cue in a first state and a random image for display on both the web page and the pop-up window, wherein said image may be compared to ensure the authenticity of the pop-up, and (iii) if the network site is determined to be illegitimate, the corresponding legitimacy indicator includes the first type visual cue in a second state.

9. The system of claim 8, wherein:
   the processor is further configured to direct the storage of a local session object on the user's network device; and
   the received user's network device identifier includes the stored local session object.

10. The system of claim 8, wherein the received network site identifier includes a network address of the network site included in the displayed web page.

11. A method of authenticating a site on a network, comprising:
    displaying, at a user's network device, a web page associated with a network site and a pop up window associated with and opened by a security server;
    transmitting, from the web page to the security server, an identifier of the user's network device and an identifier, including a referral or origin tag, of the network site;
    receiving, by the user's network device from the security server in response to the transmission of the identifiers, an indication of legitimacy of the network site, or that the security server does not know if the network site is legitimate or not; and
    displaying, at a user's network device, a legitimacy indicator corresponding to the received indication of legitimacy on both the web page and the pop-up such that the user can compare the image in the web page with that in the pop-up to assure authenticity of the network site;
    wherein (i) the pop-up window operates independently of the web page, (ii) if the received indication of legitimacy indicates that the network site is legitimate, the corresponding legitimacy indicator includes a first type visual cue in a first state, a second type visual cue and a random image chosen by the security server from a plurality of random images for display on both the web page and the pop-up window, wherein said image may be compared to ensure the authenticity of the pop-up and (iii) if the received indication of legitimacy indicates that the network site is illegitimate, the corresponding legitimacy indicator includes the first type visual cue in a second state.

12. The method of claim 11, further comprising:
    executing code embedded in the web page;
    wherein the user's network device identifier and the network site identifier are transmitted based on the execution of the embedded web page code.

13. The method of claim 11, further comprising:
    receiving, at the user's network device, a user selection of a personalized image;

storing the selected personalized image at the user's network device; and displaying the stored personalized image on the pop-up window.

* * * * *